US012567995B2

(12) United States Patent
Vaishnavi

(10) Patent No.:  US 12,567,995 B2
(45) Date of Patent:      Mar. 3, 2026

(54) METHOD AND SYSTEM TO PAUSE CONTROL LOOP EXECUTION

(71) Applicant: Lenovo (Singapore) Pte. Ltd., New Tech Park (SG)

(72) Inventor: Ishan Vaishnavi, Munich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 476 days.

(21) Appl. No.: 18/011,471

(22) PCT Filed: Jun. 18, 2021

(86) PCT No.: PCT/IB2021/055416
§ 371 (c)(1),
(2) Date: Dec. 19, 2022

(87) PCT Pub. No.: WO2021/255711
PCT Pub. Date: Dec. 23, 2021

(65) Prior Publication Data
US 2023/0362031 A1      Nov. 9, 2023

Related U.S. Application Data

(60) Provisional application No. 63/041,022, filed on Jun. 18, 2020.

(51) Int. Cl.
*H04L 12/42*      (2006.01)
*H04W 24/08*      (2009.01)

(52) U.S. Cl.
CPC ............. *H04L 12/42* (2013.01); *H04W 24/08* (2013.01)

(58) Field of Classification Search
None
See application file for complete search history.

(56) References Cited

U.S. PATENT DOCUMENTS

2014/0204100 A1* 7/2014 Holland .................... G06T 1/60
                                                              345/522
2020/0259752 A1* 8/2020 Bohge ..................... H04L 43/16
(Continued)

OTHER PUBLICATIONS

PCT/IB2021/055416, "Notification of Transmittal of the International Search Report and the Written Opinion of the International Searching Authority, or the Declaration", International Searching Authority, Sep. 3, 2021, pp. 1-13.
(Continued)

*Primary Examiner* — Jay L Vogel
(74) *Attorney, Agent, or Firm* — Kunzler Needham & Hilton

(57) ABSTRACT

Apparatuses, methods, and systems are disclosed for pausing control loop execution. In various examples, an apparatus includes a management service producer for execution management of a control loop of a mobile network, the management service producer that communicates with an operator entity of the mobile network; and one or more pause points associated to the control loop that are configurable to pause or allow message flow between a service producer at a selected stage of the control loop and a service consumer at the next stage of the control loop in response to a selected pause point of the one or more pause points being reached based on whether the selected pause point is enabled or disabled.

20 Claims, 9 Drawing Sheets

Sequence Diagram For Enabling Pause Points And Receiving Pause Notification

(56) References Cited

U.S. PATENT DOCUMENTS

2020/0340472 A1* 10/2020 Blankemeier .......... H02P 29/00
2021/0165476 A1* 6/2021 Menzel .................... G06F 1/28

OTHER PUBLICATIONS

ETSI, "Zero-touch network and Service Management (ZSM); Reference Architecture", ETSI GS ZSM 002 V1.1.1, Aug. 2019, pp. 1-80.
ETSI, "Zero-touch network and Service Management (ZSM); Closed-Loop Automation; Part 1: Enablers", ETSI GS ZSM 009-1 V1.1.1, Jun. 2021, pp. 1-40.
Huawei et al., "Add procedures for establishment of a new NE in network", 3GPP TSG-SA5 Meeting #128 85-197586, Nov. 18-22, 2019, pp. 1-6.
Samsung, "Generic SLS Assurance Procedure", 3GPP TSG-SA5 Meeting #131e S5-203204, May 25-Jun. 4, 2020, pp. 1-3.
Huawei et al., "Update Clause 4.2 Management control loops", 3GPP TSG-SA5 Meeting #130e S5-203219, Apr. 20-28, 2020, pp. 1-3.
3GPP, "3rd Generation Partnership Project; Technical Specification Group Services and System Aspects; Management and orchestration; Study on enhancement of Management Data Analytics (MDA) (Release 17)", 3GPP TR 28.809 V0.3.0, Mar. 2020, pp. 1-27.
3GPP, "3rd Generation Partnership Project; Technical Specification Group Services and System Aspects; Telecommunication management; Study on the Self-Organizing Networks (SON) for 5G networks (Release 16)", 3GPP TR 28.861 V1.1.0, Dec. 2019, pp. 1-49.
3GPP, "3rd Generation Partnership Project; Technical Specification Group Services and System Aspects; Management and orchestration; Management Services for Communication Service Assurance; Requirements (Release 16)", 3GPP TS 28.535 V1.3.0, Jun. 2020, pp. 1-17.

* cited by examiner

100

Sequence Diagram For Enabling Pause Points And Receiving Pause Notification

400
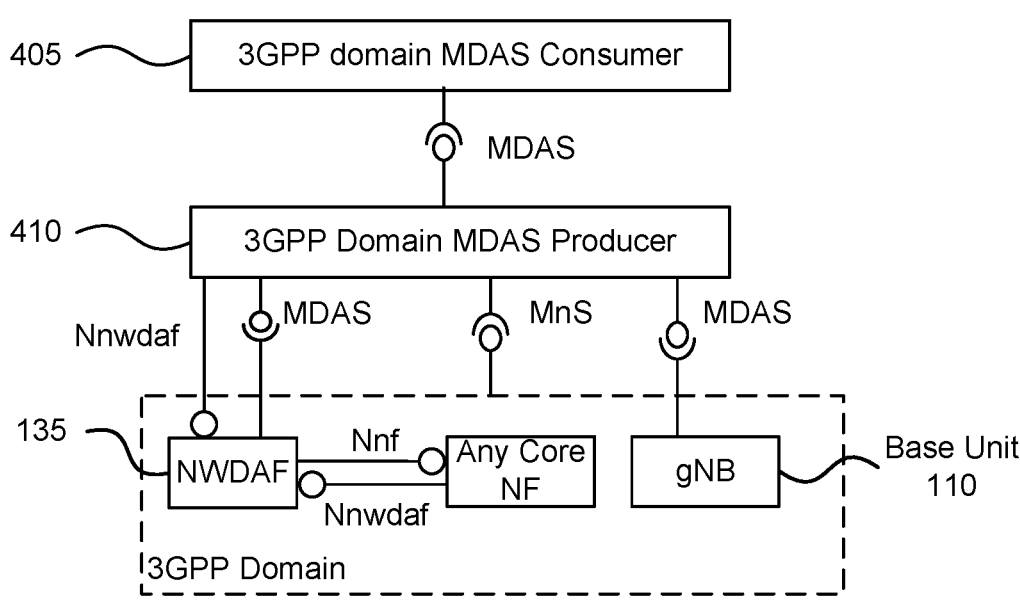
MDAS services consumed by NWDAF and gNB
FIG. 4

Example of MDAS services consumed by NWDAF and gNB

600

601

Management Service Producer For Execution Management Of A Control Loop (e.g., For MD/ Vendor Equipment)

E-1.
E-3.
E-4c.
E-6a.

Operator Entity (e.g.,Dashboard)

620

E-3. Notification Received

610

Service Producer (e.g., Analytics)

E-2.

E-6b.

E-4b.

610

Service Producer (e.g., Analytics)

Pause Point 647 Reached

E-4a.

625

615

Transformation Of The Service Producer–Consumer Relationship As A Part Of Step E-2

Intermediate Messaging Entity (e.g., Integration Fabric To Enable Pausing The Control Loop)

E-5c.

617

Service Consumer1 (e.g., Domain Intelligence Service Producer or E2E)

Service Consumer1 E.g., Domain Intelligence Service Producer of E2E

605

605

Example of Analytic Services Consumed by An Analytics Service Consumer

FIG. 6

METHOD AND SYSTEM TO PAUSE CONTROL LOOP EXECUTION

CROSS-REFERENCE TO RELATED APPLICATIONS

This application claims priority to U.S. Provisional Patent Application No. 63/041,022 entitled "METHOD AND SYSTEM TO PAUSE CONTROL LOOP EXECUTION" and filed on Jun. 18, 2020, for Ishan Vaishnavi, which is incorporated herein by reference to the extent permitted under applicable patent law and rules.

FIELD

The subject matter disclosed herein relates generally to enhanced management of control loops in wireless communications and more particularly relates to a method and entity (e.g., an apparatus and/or a system) to pause control loop execution.

BACKGROUND

In certain wireless communication systems, a User Equipment device ("UE") is able to connect with a fifth-generation ("5G") core network (i.e., "5GC"). In wireless networks, one or more control loops ("CL") (whether open or closed) may be configured to execute in an automated mode but in existing systems, automated execution of control loops produce unintended consequences and/or may require inter-active monitoring by an operator entity.

BRIEF SUMMARY

Disclosed are a method and an entity (e.g., an apparatus, and or system) providing an operator network with the ability to pause or continue the execution of control loops and an interface to request pausing and continuation for control loops within a management domain and/or vendor equipment. On pausing, the control loop is configured to automatically raise a notification with detailed status and relevant information at that pause point and then continue execution on operator approval. This enables the operator to review the execution of control loops (closed or open). Over time with multiple review cycles this can help the operator (whether the operator is a human entity using a computer-ized interface or a logical entity) to build trust in the control loop and let it run unattended (e.g., to build confidence based on feedback from network data analytics services that allow-ing the controller to run in closed-loop automated mode will not detrimentally affect the mobile network).

Pausing execution of control loop in order to ensure that selected automated portions of a control loop can execute without unintended consequences can reduce significant operational costs and allow the operator entity to reduce the need for interactive monitoring by humans and/or other entities.

Alternatively, if the operator entity finds problems with the execution status at any pause point, it can disable the control loop and communicate the issue to an appropriate vendor, solution provider, and/or administrator.

A system is disclosed that includes a management service producer for execution management of a control loop of a mobile network, the management service producer for execution management including a processor, memory, and program code operable to communicate with an operator entity of a mobile network. The system includes one or more pause points associated to the control loop that are config-urable to pause or allow message flow between a service producer at a selected stage of the control loop and a service consumer at the next stage of the control loop in response to a selected pause point of the one or more pause points being reached based on whether the selected pause point is enabled or disabled. The system in certain examples further includes an intermediate messaging entity disposed between the service producer at the selected stage and the service con-sumer at the next stage, the intermediate messaging entity configured to respectively enable or disable the selected pause point in response to a pause point enablement or disablement request from the operator entity.

A method is disclosed that, in various examples, includes associating one or more pause points to a control loop of a mobile network that are configurable to pause or resume message flow between a service producer at a selected stage of the control loop directly preceding a selected pause point of the one or more pause points and a service consumer at the next stage of the control loop. The method, in various examples, includes determining whether the selected pause point is reached and pausing or allowing message flow between the service producer at the selected stage of the control loop and the service consumer at the next stage of the control loop in response to the selected pause point being reached based respectively on whether the selected pause point is enabled or disabled. In certain examples, the method further includes respectively enabling or disabling the selected pause point in response to a pause point enablement or disablement request from an operator entity.

BRIEF DESCRIPTION OF THE DRAWINGS

A more particular description of the examples briefly described above will be rendered by reference to specific examples that are illustrated in the appended drawings. Understanding that these drawings depict only some examples and are not, therefore, to be considered to be limiting of scope, the examples will be described and explained with additional specificity and detail through the use of the accompanying drawings, in which:

FIG. 4 is a block diagram illustrating various aspects of a control loop being formed across management and control planes in which Management Data Analytics Service ("MDAS") services are consumed by Network Data Ana-lytics Function ("NWDAF") and base unit, according to one or more examples of the present disclosure:

FIG. 6 is a block diagram illustrating a European Tele-communications Standards Institute ("ETSI") Zero-touch network and Service Management ("ZSM") implementation of pausing a control loop between MDAS insights consumed by NWDAF by communicating with integration fabric, according to one or more examples of the present disclosure:

DETAILED DESCRIPTION

Figure 1:
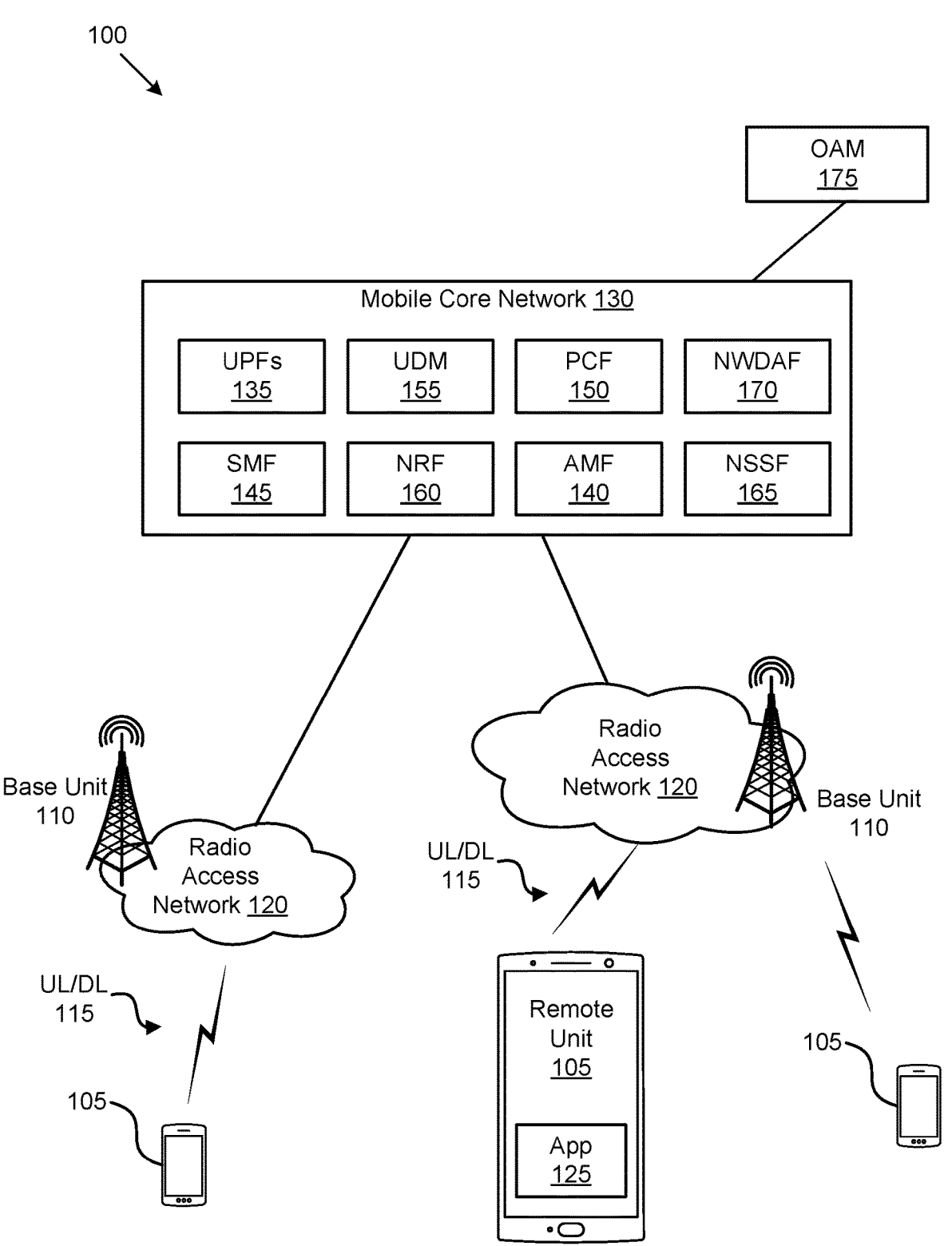
FIG. 1 is a schematic block diagram illustrating one example of a wireless communication system that enables and operator to pause and resume control loop execution, according to one or more examples of the present disclosure.

As will be appreciated by one skilled in the art, aspects of the examples may be embodied as a system, apparatus, method, or program product. Accordingly, examples may take the form of an entirely hardware example, an entirely software example (including firmware, resident software, micro-code, etc.) or an example combining software and hardware aspects.

For example, the disclosed examples may be implemented as a hardware circuit comprising custom very-large-scale integration ("VLSI") circuits or gate arrays, off-the-shelf semiconductors such as logic chips, transistors, or other discrete components. The disclosed examples may also be implemented in programmable hardware devices such as field-programmable gate arrays, programmable array logic, programmable logic devices, or the like. As another example, the disclosed examples may include one or more physical or logical blocks of executable code which may, for instance, be organized as an object, procedure, or function.

Furthermore, examples may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain example, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for examples may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the examples may be combined in any suitable manner. In the following description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Reference throughout this specification to "one example," "an example," or similar language means that a particular feature, structure, or characteristic described in connection with the example is included in at least one example. Thus, appearances of the phrases "in one example," "in an example," and similar language throughout this specification may, but do not necessarily, all refer to the same example, but mean "one or more but not all examples" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B, and C.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which executes on the computer or other programmable apparatus provides processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various examples. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements.

Overview

Generally, the present disclosure describes systems, methods, and apparatuses for pausing and resuming control loop execution. For better acceptance of automation solutions for live deployment in operational networks, enhanced ability for operator entities to control equipment controls will be required.

Management Domains

Management domains are a collection of resources that have their own management system. A management system is for example any set of management services or their implementations in management functions. Thus, management domains include things such as vendor devices with their own management system, vendor solutions, technical domains such as 3GPP core, 3GPP RAN, cloud domains, data centers, transport networks with their own controllers, operator administrative domains, country domains and so forth.

FIG. 1

FIG. 1 is a schematic block diagram illustrating one example of a wireless communication system 100 that supports NWDAF 135 that enables an operator to pause and resume control loop execution of a managed entity, according to one or more examples of the present disclosure. In various examples, the wireless communication system 100 includes at least one remote unit 105, a radio access network ("RAN") 120, a mobile core network 130, and an Operation and Maintenance System ("OAM") 140.

The RAN 120 and the mobile core network 130 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 130 are depicted in FIG. 1, one of skill in the art will recognize that any number of remote units 105, base units 110, wireless communication links 115, RANs 120, and mobile core networks 140 may be included in the wireless communication system 100.

In some implementations, the RAN 120 is compliant with the 5G system specified in the 3GPP specifications. In certain implementations, the RAN 120 is compliant with the LTE system specified in the 3GPP specifications. More generally, however, the wireless communication system 100 may implement some other open or proprietary communication network, for example, WiMAX, among other networks. The present disclosure is not intended to be limited to the implementation of any particular wireless communication system architecture or protocol.

In various examples, the remote units 105 may include computing devices, such as desktop computers, laptop computers, personal digital assistants ("PDAs"), tablet computers, smartphones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some examples, the remote units 105 include wearable devices, such as smartwatches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

The base units 110 may be distributed over a geographic region. In certain examples, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a radio access network ("RAN"), such as the RAN 120, that may include one or more controllers communicably coupled to one or more corresponding base units 110. These and other elements of the RAN are not illustrated but are well known generally by those having ordinary skill in the art. The base units 110 connect to the mobile core network 130 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110. Note that during NR-U operation, the base unit 110 and the remote unit 105 communicate over unlicensed radio spectrum.

In some examples, the mobile core network 130 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes multiple user plane functions ("UPFs") 135. The mobile core network 130 also includes multiple control plane functions including, but not limited to, an Access and Mobility Management Function ("AMF") 140 that serves the RAN 120, a Session Management Function ("SMF") 145, a Policy Control Function ("PCF") 150, a Unified Data Management function ("UDM") 155, a Network Repository Function ("NRF") 160 (used by the various NFs to discover and communicate with each other over APIs), a Network Slice Selection Function ("NSSF") 165 that selects a needed set of network slices, or other NFs defined for the 5GC.

In various examples, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. In certain examples, the mobile core network 130 includes. In certain examples, the various network slices may include separate instances of network functions, such as the SMF 155 and UPF 135. In some examples, the different network slices may share some common network functions, such as the AMF 150. The different network slices are not shown in FIG. 1 for ease of illustration, but their support is assumed.

In certain examples, the mobile core network 130 supports network data analytic functions ("NWDAF") 170 that can provide network slice level data analytics (e.g., load level information) to PCF 150 and the NSSF 165. The PCF 150 can use that data in its policy decisions. In some examples, the NWDAF 170 communicates with an Operation and Maintenance System ("OAM") 175. In certain examples, the OAM 175 receives a pause point reached notification.

Although specific numbers and types of network functions are depicted in FIG. 1, one of skill in the art will recognize that any number and type of network functions may be included in the mobile core network 130. Moreover, where the mobile core network 130 is an EPC, the depicted network functions may be replaced with appropriate EPC entities, such as an MME, S-GW, P-GW, HSS, and the like. In certain examples, the mobile core network 130 may include a AAA server.

While FIG. 1 depicts components of a 5G RAN and a 5G core network, the described examples apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 150 may be mapped to an MME, the SMF 155 mapped to a control plane portion of a PGW and/or to an MME, the UPF map to an SGW and a user plane portion of the PGW, the UDM/UDR maps to an HSS, etc.

In the following descriptions, the term "gNB" is used for the base station 110 but it is replaceable by any other radio access node, e.g., RAN node, eNB, BS, eNB, gNB, AP, NR, etc. Further, the operations are described mainly in the context of 5G NR. However, the proposed solutions/methods are also equally applicable to other mobile communication systems.

FIG. 2

Figures 2A, 2B:
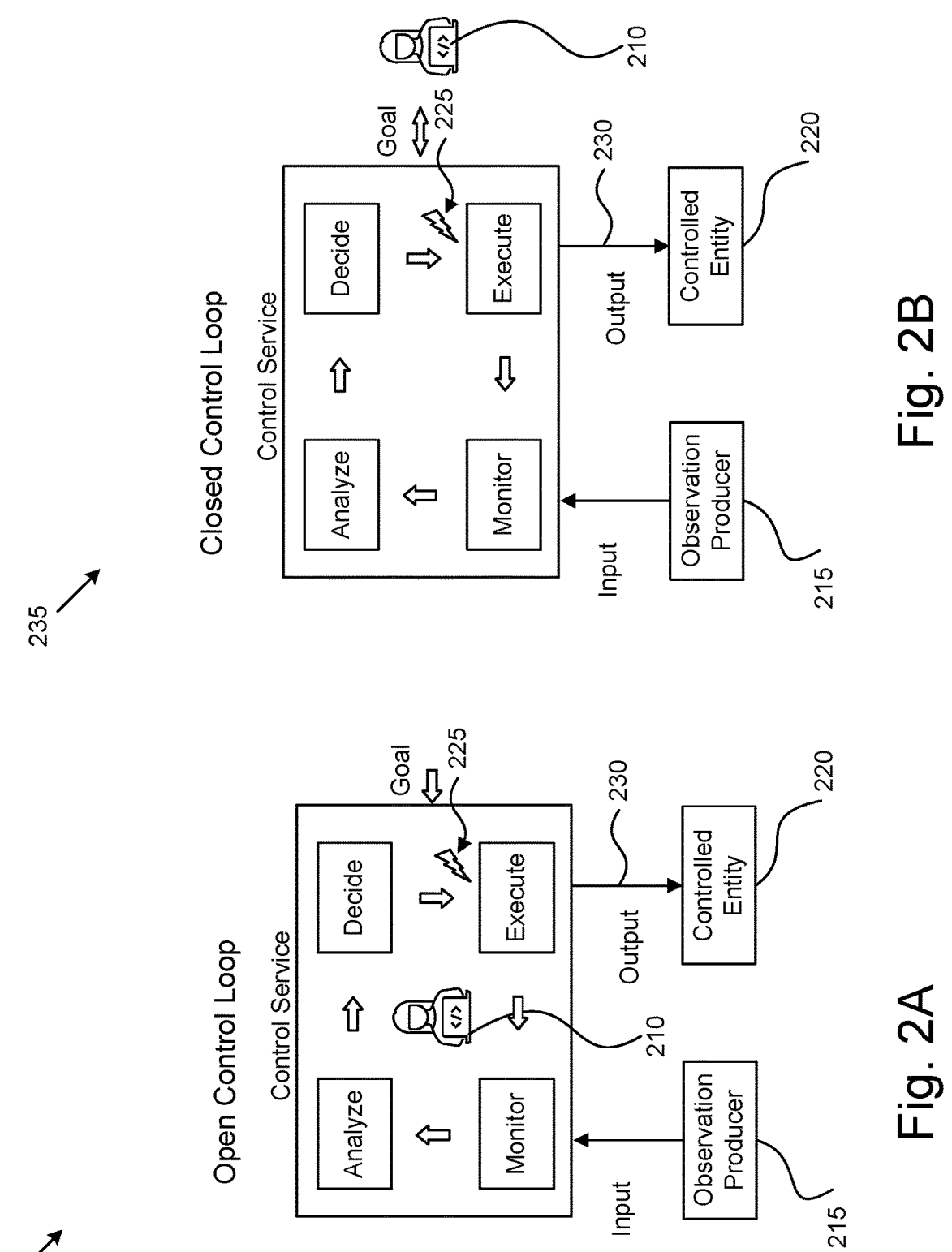
FIG. 2A is a diagram depicting an open control loop according to one or more examples of the present disclosure.
FIG. 2B is a diagram depicting a closed control loop according to one or more examples of the present disclosure.

FIG. 2A is a diagram depicting an open control loop 205 according to one or more examples of the present disclosure. FIG. 2B is a diagram depicting a closed control loop 235 according to one or more examples of the present disclosure. Work in SA5 (TS28.535) and elsewhere defines the two extremes of open and closed control loops—an open control loop 205 as depicted in FIG. 2A and a closed control loop 235 as depicted in FIG. 2B.

An open control loop provides for an operator 210 to be a part of at least one of the stages in the control loop 205. A closed control loop 235 provides for the operator 210 to define a goal for the closed control loop 235 and once configured, the closed control loop 235 runs automatically. Both the open control loop 205 and closed control loop 235 attempt to control the status of a managed object (e.g., controlled entity 220) with the objective to keep the managed object as close as possible to an operator-specified desired state. As described in more detail below, the various examples of the methods and entities (e.g., systems and/or apparatuses) of the present disclosure, describe various features that improve open control loops 205 and closed control loops 235, by providing one or more pause points 225 that enable an operator 210 to pause execution of automated parts of the control loop 205, 235, review network analytics data, decide whether to resume execution of the control loop 205, 235 based on the reviewed data.

It may be noted by a person of skill in the art that although various examples described and depicted in the present application refer to closed control loops, various features related to pausing execution of control loops at configurable pause points may be applied to open control loops or portions thereof.

Closed Loop Models

In various examples, there are multiple models of closed loops 235. Some examples of closed loop models include OODA (Observe, Orient, Decide, Act), MAPE-K (Monitor, Analyze, Plan, Execute over a shared Knowledgebase), and so forth. In some examples, the closed control loops 235 are composed of multiple stages. The number of stages in various closed control loops is not necessarily fixed. The multiple stages of the closed control loop 235 primarily involve: (i) observation (e.g., monitoring) of the system: (ii) analysis of the observed information: (iii) a comparison of the observed information with the desired state: (iv) a decision of what action to take based on the comparison; and (v) the execution of those decisions. Various stages of closed control loops 235 may exchange information with each other over a knowledge base. However, stages may be skipped, or further stages may be added creating closed loops with any number of stages. Certain stages with particular kinds of observations of the system, and execution of the action decisions based on a comparison of the observations may be mandatory.

Trustworthy Governance of Control Loops

Ongoing work in 5G (e.g., SA5 and ETSI ZSM) is looking into control loop automation solutions to reduce operating expenditures ("OPEX") for operators 210. The operator's trust in the execution of the control loops, particularly a closed control loop 235, is a very important aspect of automation. Without such a trust (e.g., confidence or assurance that allowing automated portions of the control loop to run unattended) the operator 210 (whether a human entity using a dashboard and interface or a logical entity that monitors the control loop 235 would be reluctant to enable the closed control loop 235 in the deployed system. Thus, the author(s) of the present disclosure mechanisms recognized a need to enable the building of operator trust in control loops. One such feature is the ability of the operator 210 to control/govern (e.g., pause/resume/stop) the execution of control loops 205, 235 in vendor equipment or management domains.

In an ETSI Zero-touch network and Service Management, a closed loop governance service is defined as shown in Table 1 below. In some existing systems (e.g., ZSM), the closed loop governance/execution management service as described can: i) provide status information; ii) manage the lifecycle of a closed loop; iii) manage relevant models; and iv) provide relevant closed loop performance information. Example. One of skill in the art may note that as defined in existing systems, no provision is made for pausing and/or resuming execution of automated portions of a closed control loop.

For example, as noted in Table 1 below,

TABLE 1

| Existing closed loop governance service description in ZSM009-1 | |
| --- | --- |
| Service name | Closed loop governance Service |
| External visibility | Optional |
| | Editor's note: The final external visibility of this service is FFS. |
| | Editor's note: All agree that this service is mandatory for internal use. |
| | How to capture that in the current format is unclear. |
| | Service capabilities |
| Provide closed loop status information (M) | Provide the current status of a specific closed loop. Status information can be, for example, the health of the closed loop, the phase of the loop in its lifecycle. An optional extension of this capability could include a history of status information or the status of a particular past timestamp. |
| Manage Closed Loops Lifecycle (M) | Manage the closed loop according to the closed loop model. This could include activating, deactivating, and suspending a closed loop. The closed loop model to be used needs to be specified. Editor's Note; Closed loop models and life cycle of closed loops as well as their relationship to the management of MnS, Stages, MFs are FFS |
| Manage closed loop models (M) | Manage (read, list) closed loops models. Certain phase transitions (in CL life cycle) may be included in the CL model. Editor's note: Whether this is part of a separate service is FFS |
| Provide performance information (O) | Provide relevant performance information on closed loops. Performance information could include for example the closed loop's expected impact time. |

50

TABLE 2

| related references for the management of control loops | | |
| --- | --- | --- |
| Source/publication date | Title | Description |
| S5-203219 | Update Clause 4.2 management control loops | Introduces the possibility of the human operator to change the closed control loop to an open control loop. Doesn't explain how. |
| S5-203224 | Generic SLS Assurance Procedure | Generic procedure for Assurance control loop in SA5. (This may be used as a basis upon with the SA5 example described below may be implemented) |

TABLE 2-continued related references for the management of control loops

| Source/publication date | Title | Description |
|---|---|---|
| ETSI GS ZSM009-1 V0.6.2 Section 8 | Closed loop governance service | This is the generic service specifying the functionalities used to govern the closed control loop. This is the current state of the art for closed loop governance upon which certain examples of this disclosure may be implemented. |
| ETSI GS ZSM002 V1.1.1 | Zero-touch network and Service Management (ZSM); Reference Architecture | The architecture for the E2E management domain and the service provided by individual management domains. |
| TR 28.809 | Study on the enhancement of management data analytics | The current status of analytics in closed loops taken as a starting point example for implementation of various examples of this disclosure. |

High-Level Solution—Operator Pause/Resume of Control Loops

A method and entity (e.g., system or apparatus) for operator pause and play (e.g., resume) of open control loops 205, as well as closed control loops 235, enables an operator 210 entity (e.g., a human operator viewing an operations dashboard such as an analytics dashboard, or a logical entity within a management system) to review outputs 230 (such as for example analytics insights) at different points during the automated execution of the control loop before letting the loop run further. At various points of execution, pause points 225 are included in a control loop, at which pause points 225, the operator may pause the execution of the automatically executing part of the control loop 205, 235. The pause points 225 are particularly relevant to the closed control loop 235, but may also apply to parts of an open control loop 205 which execute automatically so that with either open control loops 205 or closed control loops 235, the operator 210 may pause the execution of the loop to review its state before proceeding. For example, if the operator 210 can review and approve the actions that the closed control loop 235 is going to execute over the operator network before the closed control loop executes them, the operator 210 is more likely to enable the execution of such a closed control loop 235 in the network. This is because the operator 210 is confident that the closed control loop 235 will not execute unwanted actions over the operator network.

Review of such actions over a significant period can let the operator 210 decide if the operator trusts the closed control loop 235 to let the closed control loop 235 execute unattended (e.g., by examining the status of the managed entity at various pause points within the control loop 205, 225 to ensure that no unacceptable statuses or unintended consequences are produced by letting the automated portion of the control loop 205, 225 execute unattended).

As depicted in Table 3, the Management Service Producer for Execution Management of a Control Loop that is responsible for meeting certain predetermined goals for a managed entity.

In various examples, the following control loop pause features or any combinations of the listed Features may be implemented as mandatory or optional features (as noted below) on vendor equipment/solutions/management domains that contain control loops:

Feature 1—Operator 210 requests information from Management Service Producer for Execution Management about the pause points 225 in the control loop 205, 235 and status information on the output 230 from them (Mandatory);

Feature 2—The Management Service Producer Execution Management (which in some examples, may also be used for CL Governance) provides an interface to enable/disable those pause points 225 (Mandatory);

Feature 3—Provide a mandatory notification to the OAM 175 and/or the Operator 210 (Mandatory):

Feature 4—Provide the ability to continue the execution of a paused control loop 205, 235 (Mandatory):

Feature 5—For the disabled stop points (e.g., pause points), provide optional notification or log of stop point passing (e.g., a pause point reached notification) (Optional); and Feature 6-Provide the ability to request pausing of a control loop 205, 235 (Optional).

Although for certain examples, a feature may be described as mandatory and/or optional in the listing of features above, and other examples, features described as mandatory may be optional and or features described as optional may be mandatory depending upon the implementation.

Figure 3:
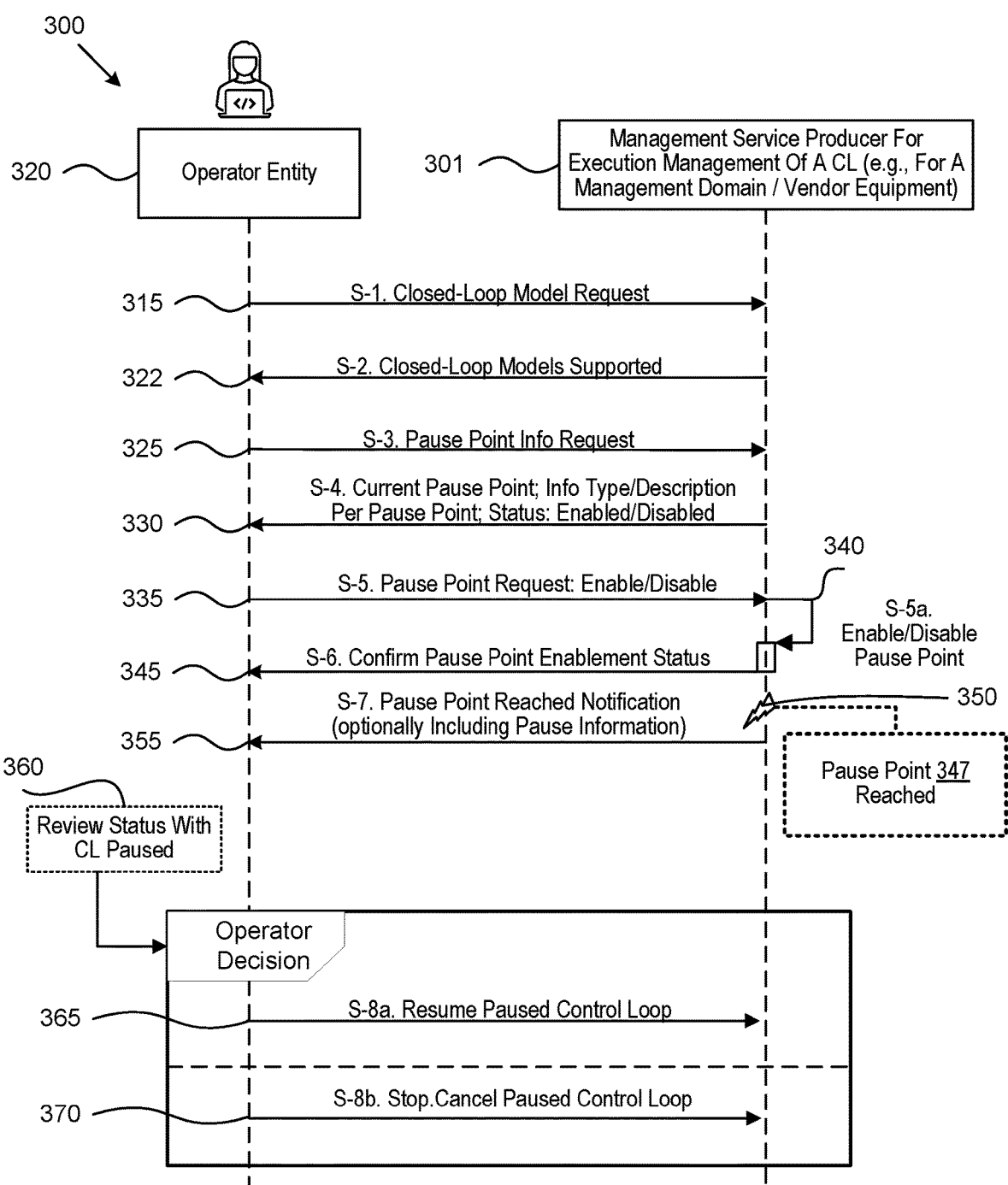
FIG. 3 is a diagram depicting a sequence scenario for enabling pause points and receiving pause notification, according to one or more examples of the present disclosure.

An example method of how such a solution may be used is shown in FIG. 3.

FIG. 3

FIG. 3 is a diagram depicting a sequence scenario 300 for enabling pause points 350 and receiving pause notification (e.g., pause point reached notification 355), according to one or more examples of the present disclosure.

The operator 320 refers to the system administrator or any entity that is authorized to manage the pause points 350 of specific control loops (e.g., 205, 235). The operator entity 320 in this sequence diagram normally acts via a dashboard software front end and in certain examples, may be a logical entity or an automated software entity in any diagrams of the present disclosure.

The Management Service Producer for Execution Management of the control loop (may also be used for CL governance) is a logical entity that supports the interface to manage the pause points 350 for control loops 205, 235 acting on any managed entity (e.g., 220) or within a system, operator network, vendor equipment or management domain. It may also support the interfaces in steps S-1; and S-2. To get control loop related information, but this is not necessary, and this information could be received from elsewhere. The term service producer refers to the implementation of a given management service or functionality. One of skill in the art may note that FIG. 3, shows a single logical entity Steps of the Sequence Diagram In various examples, one or more steps S-1 through S-8b may be performed by the operator entity directly 320 and/or via the management service producer for execution management 301 of the control loop. At step S-1, the operator entity 320 may get (e.g., request) 315 the supported control loop models and other details related to the control loops.

At step S-2, the requested details for the particular control loop (Example: stages in the closed loop, performance parameters, and so forth) are provided 322 (e.g., by the management service producer for execution management 301).

At step S-3, the operator 320 can get the pause points supported by a given set of control loop models (e.g., by sending 325 a pause point information request).

At step S-4, the system (e.g., the service producer 301 for CL governance) returns 330 the supported pause points for a control loop or a control loop model. Per pause point, examples of various types of control loop information may be provided including, by way of non-limiting examples, the following types of information (Feature 1): (i) The description of the pause point in relation to the control loop and/or its stages the control loop is transitioning from/to. Example: At this pause point, the analytics stages (e.g., of the automated part of the control loop) have run and that control loop is feeding the analytics insights (from the analytics stages) into the decision part of the control loop. (ii) Information related to the network and flow of the control loop. Example: the current analytics insights themselves. (iii) A description of the available information. Example: The insight was received based on data of UE mobility and predicts future UE movements: (iv) Next pause point: (v) Existing control loops with this pause point: (vi) information related to the manage entities for which the control loop is responsible. The types of information provided 330 at each pause point described above are merely exemplary and a skilled artisan may recognize that any state or status information related to the management service provider and/or the managed entity may be provided in response to the pause point information request.

At step S-5, the operator 320 may choose to enable 335 and/or disable a subset of the pause points (Feature 2). At step S-5*a*, the service producer 301 may internally configure the management domain to enable 340 to pause at a selected pause point according to an internal implementation of the management domain.

At step S-6, the system (e.g., the service producer 301) may provide 345 a confirmation of one or more pause points being enabled/disabled (e.g., the service producer confirms an enablement status of one or more pause points). This confirmation may include details such as the address to subscribe on to receive notifications of pause point hit (e.g., a subscription address to receive a pause point reached notification).

At step S-7, when the control loop in the management domain hits (e.g., reaches) a pause point, a notification (e.g., a pause point reached notification is sent out to all the subscribers to such a notification. This includes for example software frontend that the operator is using to manage the management domain. (Feature 3)

In response to receiving the notification (i.e., the pause point reached notification), the operator 320 can review 360 the pause point information and decide to resume 365 (or stop or cancel) the execution of the control loop. (Feature 4)

In some examples, certain optional features may be implemented but are not shown in the solution depicted in FIG. 3. In various examples, these optional features are implemented as follows: Feature 5 can be implemented by sending the notification of a disabled pause point to a logging service. This allows a log entry to be recorded each time the disabled pause point is reached even though the execution of the control loop is not paused when the disabled pause point is reached. In some examples, the log entry can include information such as described above with respect to Feature 1. Various combinations of pause point enablement and logging enablement may be configured. For example: (1) pause enabled, logging enabled: (2) pause enabled, logging disabled (less likely): (3) pause disabled, logging enabled: (4) pause and logging disabled. It may be noted that when logging is enabled, the log entry is saved irrespective of the pause point status (e.g., pause point enabled, disabled, reached, etc.).

In certain examples, Feature 6 can be implemented using Feature 2 by enabling and/or disabling all possible pause points in the control loop.

Any combination of the foregoing Features or portions thereof may be implemented in various examples.

An example of a management service specification that supports pause of control loop execution is shown below in Table 3.

TABLE 3

| An example of a management service specification. Each functionality may be specified independently. | |
| --- | --- |
| Service name | Control loop execution management service (e.g., provided by a Management Service Producer for Execution Management of the Control Loop Service functionalities) |
| Provide control loop pause information | Provide the supported pause points related to a control loop and the related information. Related information could include The description of the pause point in relation to the control loop and/or the stage in which the control is paused and/or the states which the control is transitioning from/to. Available control loop related information for the network or the managed entities of the control loop and flow of the control loop Description of the available control loop related information Next pause point Existing control loops with this pause point |
| Enable/ Disable pause point | Provides an ability for the service consumer to enable or disable a particular pause point for a particular control loop. |
| Provide the notification for a pause point hit (M) | The service provides a notification to the subscribers once a pause point is hit. For enabled pause points this notification is mandatorily transmitted to the operator (the service consumer) that enabled it. For disabled pause points, the notification may just be used for logging purposes. |

TABLE 3-continued

An example of a management service specification. Each functionality may
be specified independently.

| | |
|---|---|
| Continue control loop execution (M) | The service consumer asks for continuing a paused control loop execution. |
| Pause a control loop (O) | Pause a control loop as soon as possible at the next feasible pause point. (This can be implemented by enabling all possible pause points of a control loop) |

It may be noted by one of skill in the art that these functionalities can be spread over multiple control loop related management services specification. They may be specific to closed or open control loops.

Example 1 (SA5-based)

FIG. 4

FIG. 4 is a block diagram illustrating various aspects of a control loop 400 that is formed across management and control planes in which Management Data Analytics Service ("MDAS") services are consumed by Network Data Analytics Function ("NWDAF") 135 and base unit 110, according to one or more examples of the present disclosure.

An example is shown of an implicit closed control loop 400 across 3GPP management and control planes. In the depicted example, the management data analytics service (MDAS) consumes data from various data sources (not shown in the figure) and based on analysis provides insights to service consumers in the core (NWDAF-Network Data Analytics Function) 135 and RAN (gNB) 110, as well as northbound to an external MDAS consumer 405. In other words, one way in which the control loop 400 is formed, as depicted in FIG. 4, may be via MDAS 410 providing management level analytics to NWDAF 1335 which in turn provides control level analytics to any core NF and finally a core network function may modify the network. The network changes are monitored back and the collected data from monitoring feeds into the MDAS.

Following the path of NWDAF 135, the NWDAF 135 consumes insights from the MDAS and data from the user and control planes (not shown in the picture) to further generate analytics consumed by any core network function (NF). A core network function such as the SMF 145 (depicted in FIG. 1) can then execute various decisions based on such insights closing the control loop.

FIG. 5

Figure 5:
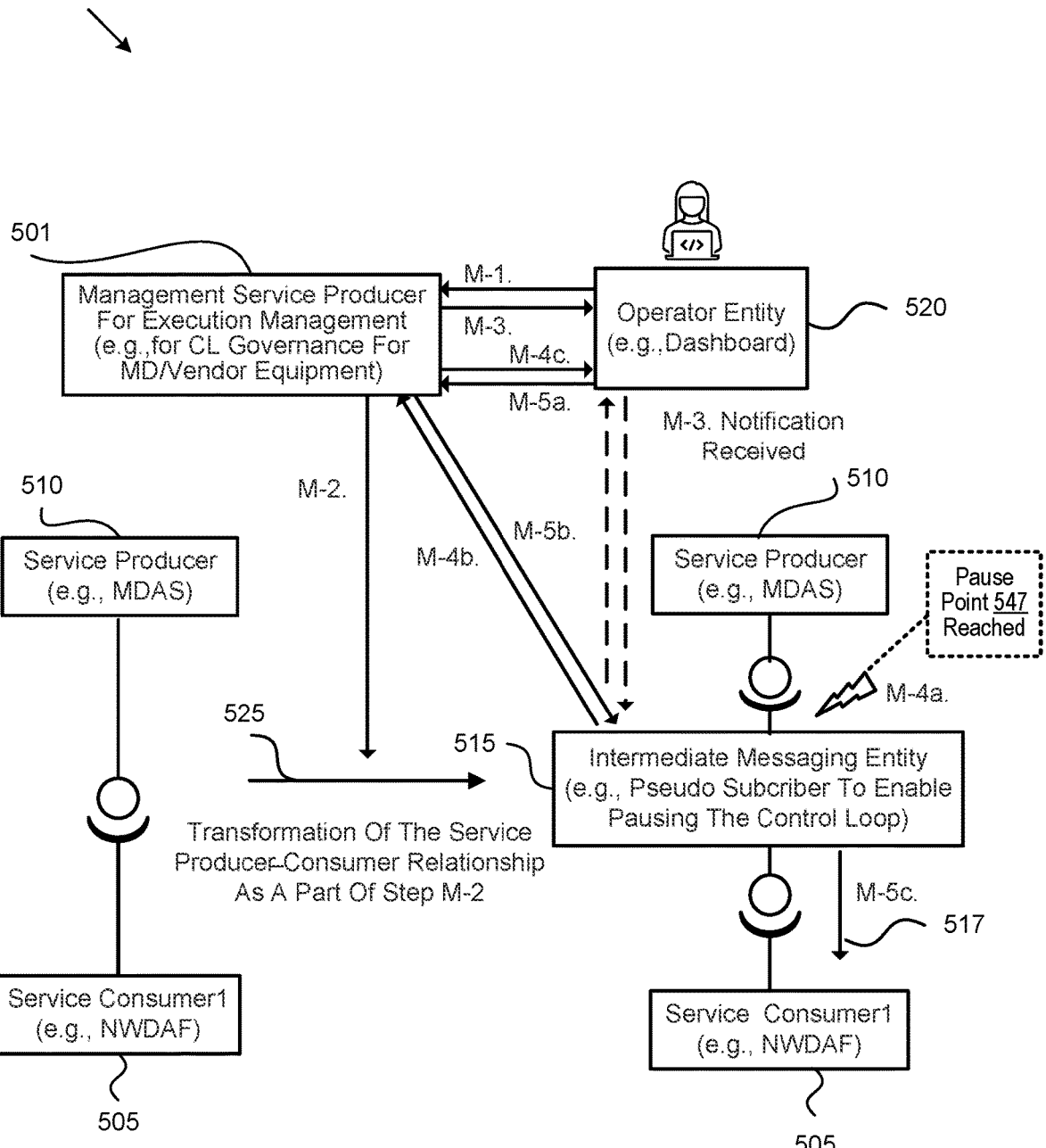
FIG. 5 is a block diagram illustrating a Third Generation Partnership Project ("3GPP") management domain imple-mentation of pausing a control loop between MDAS insights consumed by NWDAF by inserting a pseudo-subscriber, according to one or more examples of the present disclosure.

FIG. 5 is a block diagram of Example 1, illustrating a 3GPP management domain implementation 500 of pausing a control loop between a service producer (e.g., an analytics service producer) that produces MDAS insights which are consumed by a service consumer (e.g., NWDAF, where the implementation is accomplished by inserting a pseudo-subscriber 515, according to one or more examples of the present disclosure. The implementation 500 may be beneficial in the context of a 3GPP management domain. An explanation of the labels (e.g., M-1 through M-5c) that refer to steps of operation is as follows:

At step M-1, the operator entity 520 (e.g., at a dashboard if a human entity, or located someone on the network if a logical entity) chooses to enable a pause point after insights are generated by the MDAS for a particular control loop. This step MI is referred to as step S-5 of the high-level solution sequence diagram depicted in FIG. 3.

At step M-2, the management service producer for execution management 501 (may also be used for CL governance in certain example) in this implementation transforms the normal consumption of MDAS insights by MDAS consumer 1 505 for the specified control loop by: (i) unsubscribing the MDAS consumer 1 from the insights specific to the given control loop: (ii) subscribing a pseudo subscriber to those insights (this pseudo subscriber 515 could be co-located with the service producer 510 itself or, for example, could be the service bus); and (iii) subscribing the MDAS consumer to notification of insights from the pseudo subscriber. This happens after the operator has approved the continuation of the control loop. This step M-2 is referred to as step S-5a of the high-level solution depicted in FIG. 3.

At step M-3, on a successful configuration in step M-2 (internal to the management system) the SPCLG 501 positively replies to the operator 520 confirming the enabling of the pause point. This is referred to as step S-6 of the high-level solution depicted in FIG. 3.

At step M-4a, once the MDAS in the 3GPP management domain produces an insight relevant to the control loop (e.g., in response to an enabled pause point 547 of the control loop being reached), the pseudo subscriber 515 is notified.

At steps M-4b and M-4c, the pseudo subscriber 515, in turn, notifies the operator 520 e.g., via a dashboard. This refers to step S-7 of the high-level solution depicted in FIG. 3. Thus, the message flow 517 continues and information (e.g., analytical insights and further information regarding the insights) are passed on to the operator 520. While the depicted example shows the pseudo subscriber 515 notifying the operator 520 via the SPCLG 501, in other examples the pseudo subscriber 515 may interact directly with the operator 520 to pass on the insights and further information.

At steps M-5a and M-5b, the operator 520 decides to approve the insights and further continue the control loop by indicating to continue the control loop to the pseudo subscriber 515 entity via the SPCLG 501.

At step M-5c, the creation of MDAS insights is then notified to the MDAS Consumer1 505 continuing the control loop. This is referred to as step S-8 of the high-level solution depicted in FIG. 3.

Example 2 (ZSM-based)

FIG. 6

FIG. 6 is a block diagram illustrating a ZSM implementation of pausing a control loop between stages of a control loop such as for example, a service producer stage that produces MDAS insights which are consumed by a service consumer such as NWDAF by communicating with integration fabric, according to one or more examples of the present disclosure. In one example, based on the ZSM framework, the intermediate management entity which was implemented by inserting pseudo subscriber 515 between stages of the control loop in an SA5 implementation, described above with respect to FIG. 5, is replaced by the integration fabric 615. The integration fabric 615 is described in ETSI GS ZSM002. The integration fabric 615 serves as a message bus. Conceptually the message bus is analogous to an online message board where a user posts a question (request for service) and someone who knows the answer may reply. For example, when a service consumer is looking for a service producer that, for example provides analytics insights, then the service consumer may request such a service from the integration fabric. The integration fabric may then send this request to all analytics insight service producers which may in turn respond if they can provide the requested service. The service consumer may then subscribe to receive to the service producer. The service producer 510 (e.g., an MDAS service producer) in the SA5 example described above with respect to FIG. 5, is replaced by another service producer 610 which forms a part of the control loop. For example, the manage service producer 610 may be a service producer for Domain analytics or, in another example, a service producer for E2E Service analytics.

Similarly, the service consumer 505 of the SA5 example described above with respect to FIG. 5 may be instead, for example, a service consumer 605 that is in turn, a service producer of the domain intelligence as depicted in FIG. 6. The steps (e.g., E-1 through E5c may be substantially implemented as described above with respect to Example 1 depicted in FIG. 5, using appropriately replaced entities (e.g., to the ZSM implementation as compared with the SA5 3GPP implementation).

Referring to FIGS. 5 and 6, some of the examples depicted and described refer to a control loop pause at stage N where N is the analytics stage and the next stage N+1 is the decision stage as depicted in FIG. 2B. However, a skilled artisan may recognize that the intermediate Bmessaging entity may be disposed between any a service producer and a service consumer at any stage of the control loop, e.g., monitor-analyze, analyze-decide, decide-execute, execute monitor to enable the control loop to be paused and/or resumed along with message flow (517, 617) based on reaching the one or more pause points (547, 647). Furthermore, pause points may be configured to function in an open control loop to allow pausing and/or logging at selected pause points, thus giving the open control loop operator control and visibility than would otherwise be available. Lastly, a person skilled in the art may recognize that even internally within stages there may be multiple further stages and/or substages, for example the analytics stage may further be composed of data collection, processing, filtering and so forth. A skilled artisan may recognize that the same concept applies equally to those substages.

FIG. 7

Figure 7:
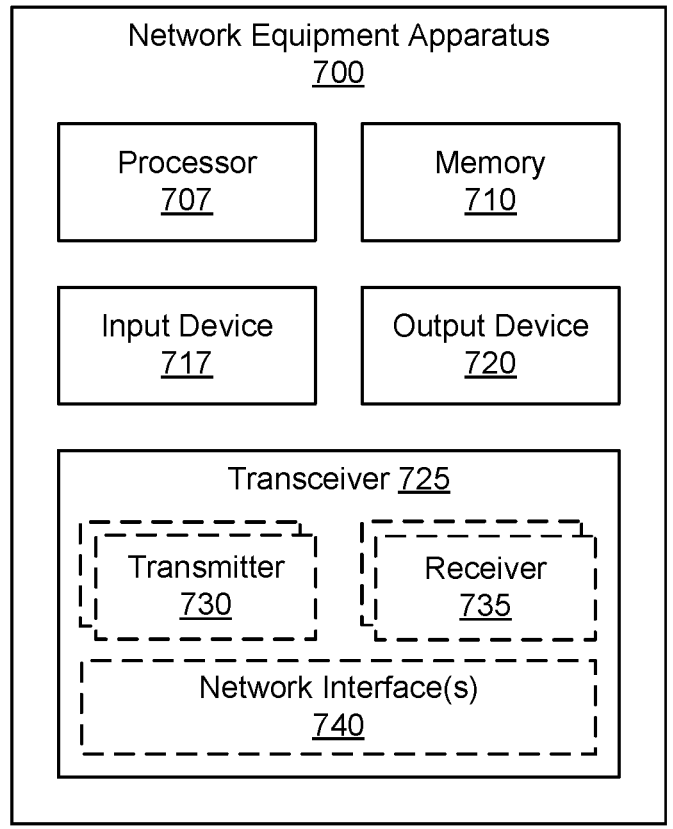
FIG. 7 is a block diagram a network equipment apparatus that may be used in connection with a system to pause control loop execution for an operator network.

FIG. 7 depicts a network equipment apparatus 700 that may be used for communications in an operator network, in which one or more operational entities are managed by a control loop that is at least partially automated and that provides an operator with the ability to enable and/or disable pause points to manage control loop information based, for example, on insights from network data analytics, according to various examples of the disclosure. The network equipment apparatus 700 may illustrates an example of the base unit 110 or RAN node, described above. Furthermore, the base network equipment apparatus 700 may include a processor 705, a memory 710, an input device 715, an output device 720, and a transceiver 725. In some examples, the input device 715 and the output device 720 are combined into a single device, such as a touchscreen. In certain examples, the network equipment apparatus 700 may not include any input device 715 and/or output device 720. In various examples, the network equipment apparatus 700 may include one or more of: the processor 705, the memory 710, and the transceiver 725, and may not include the input device 715 and/or the output device 720.

The processor 705, in one or more examples, may include any known controller capable of executing computer-readable instructions and/or capable of performing logical operations. For example, the processor 705 may be a microcontroller, a microprocessor, a CPU, a GPU, an auxiliary processing unit, a FPGA, or a similar programmable controller. In some examples, the processor 705 executes instructions stored in the memory 710 to perform the methods and routines described herein. The processor 705 is communicatively coupled to the memory 710, the input device 715, the output device 720, and the transceiver 725.

In various examples, the network equipment apparatus 700 is a RAN node (e.g., gNB), as described herein. Here, the processor 705 controls the network equipment apparatus 700 to perform the above-described behaviors.

The memory 710, in one or more examples, is a computer readable storage medium. In some examples, the memory 710 includes volatile computer storage media. For example, the memory 710 may include a RAM, including dynamic RAM ("DRAM"), synchronous dynamic RAM ("SDRAM"), and/or static RAM ("SRAM"). In some examples, the memory 710 includes non-volatile computer storage media. For example, the memory 710 may include a hard disk drive, a flash memory, or any other suitable non-volatile computer storage device. In various examples, the memory 710 includes both volatile and non-volatile computer storage media.

In some examples, the memory 710 stores data related that may be used for communications in an operator network, in which one or more operational entities are managed by a control loop that is at least partially automated and that provides an operator with the ability to enable and/or disable pause points to manage control loop information based, for example, on insights from network data analytics, according to various examples of the disclosure. For example, memory 710 may store various parameters, configurations, policies, and the like as described above. In certain examples, the memory 710 also stores program code and related data, such as an operating system or other controller algorithms operating on the network equipment apparatus 700.

The input device 715, in one or more examples, may include any known computer input device including a touch panel, a button, a keyboard, a stylus, a microphone, or the like. In some examples, the input device 715 may be integrated with the output device 720, for example, as a touchscreen or similar touch-sensitive display. In various examples, the input device 715 includes a touchscreen such that text may be input using a virtual keyboard displayed on the touchscreen and/or by handwriting on the touchscreen. In certain examples, the input device 715 includes two or more different devices, such as a keyboard and a touch panel.

The output device 720, in one or more examples, is designed to output visual, audible, and/or haptic signals. In some examples, the output device 720 includes an electronically controllable display or display device capable of outputting visual data to a user. For example, the output device 720 may include, but is not limited to, an LCD, an LED display, an OLED display, a projector, or a similar display device capable of outputting images, text, or the like to a user. As another, non-limiting, example, the output device 720 may include a wearable display separate from, but communicatively coupled to, the rest of the network equipment apparatus 700, such as a smartwatch, smart glasses, a heads-up display, or the like. Further, the output device 720 may be a component of a smartphone, a personal digital assistant, a television, a tablet computer, a notebook (laptop) computer, a personal computer, a vehicle dashboard, or the like.

In certain examples, the output device 720 includes one or more speakers for producing sound. For example, the output device 720 may produce an audible alert or notification (e.g., a beep or chime). In some examples, the output device 720 includes one or more haptic devices for producing vibrations, motion, or other haptic feedback. In some examples, all or portions of the output device 720 may be integrated with the input device 715. For example, the input device 715 and output device 720 may form a touchscreen or similar touch-sensitive display. In certain examples, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the PLMN and/or RAN, as described herein. Although only one transmitter 730 and one receiver 735 are illustrated, the network equipment apparatus 700 may have any suitable number of transmitters 730 and receivers 735. Further, the transmitter(s) 725 and the receiver(s) 730 may be any suitable type of transmitters and receivers.

FIG. 8

Figure 8:
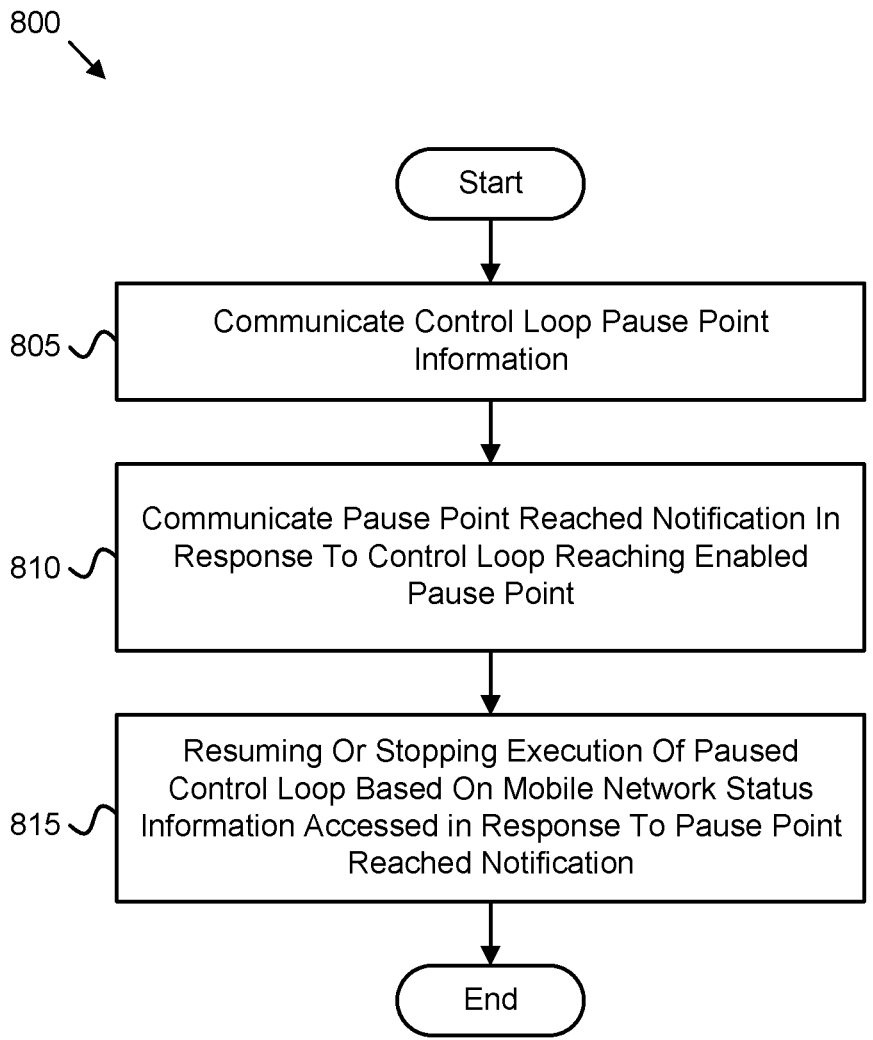
FIG. 8 is a flowchart diagram illustrating a method for pausing control loop execution, according to one or more examples of the present disclosure.

FIG. 8 is a flowchart diagram of a method 800 for pausing control loop automation. In one or more examples, the method 800 begins and includes communicating 805 control loop information between a management service producer for execution management of a control loop for a mobile network and an operator entity for the mobile network, the control loop information including one or more pause points associated to a control loop that are configured to pause execution of an automatically executing part of the control loop acting on a managed entity of the operator entity.

In various examples, the method 800 continues and includes communicating 810 a pause point reached notification between the management service producer for execution management and the operator entity in response to the control loop reaching an enabled pause point of the one or more pause points.

In certain examples, the method 800 continues and includes resuming or stopping 815 execution of a paused control loop in response to status information for the mobile network, the status information accessed in response to the pause point reached notification, and the method 800 ends.

In some examples, the method 800 includes one or more high level solutions steps S-1 through S8b described above with respect to FIG. 3. In various examples, the method 800 includes one or more 3GPP-based steps M-1 through M-5c described above with respect to FIG. 5 and/or one or more network ETSI ZSM-based steps E-1 through E-5c described above with respect to FIG. 6. Furthermore, in various examples, the method 800 includes selected combinations of steps described above with respect to FIGS. 3, 5, and 6.

In various examples, the method 800 may be performed by the system 100 depicted above with respect to FIG. 1 and/or other mobile network entities, components, or services.

FIG. 9

Figure 9:
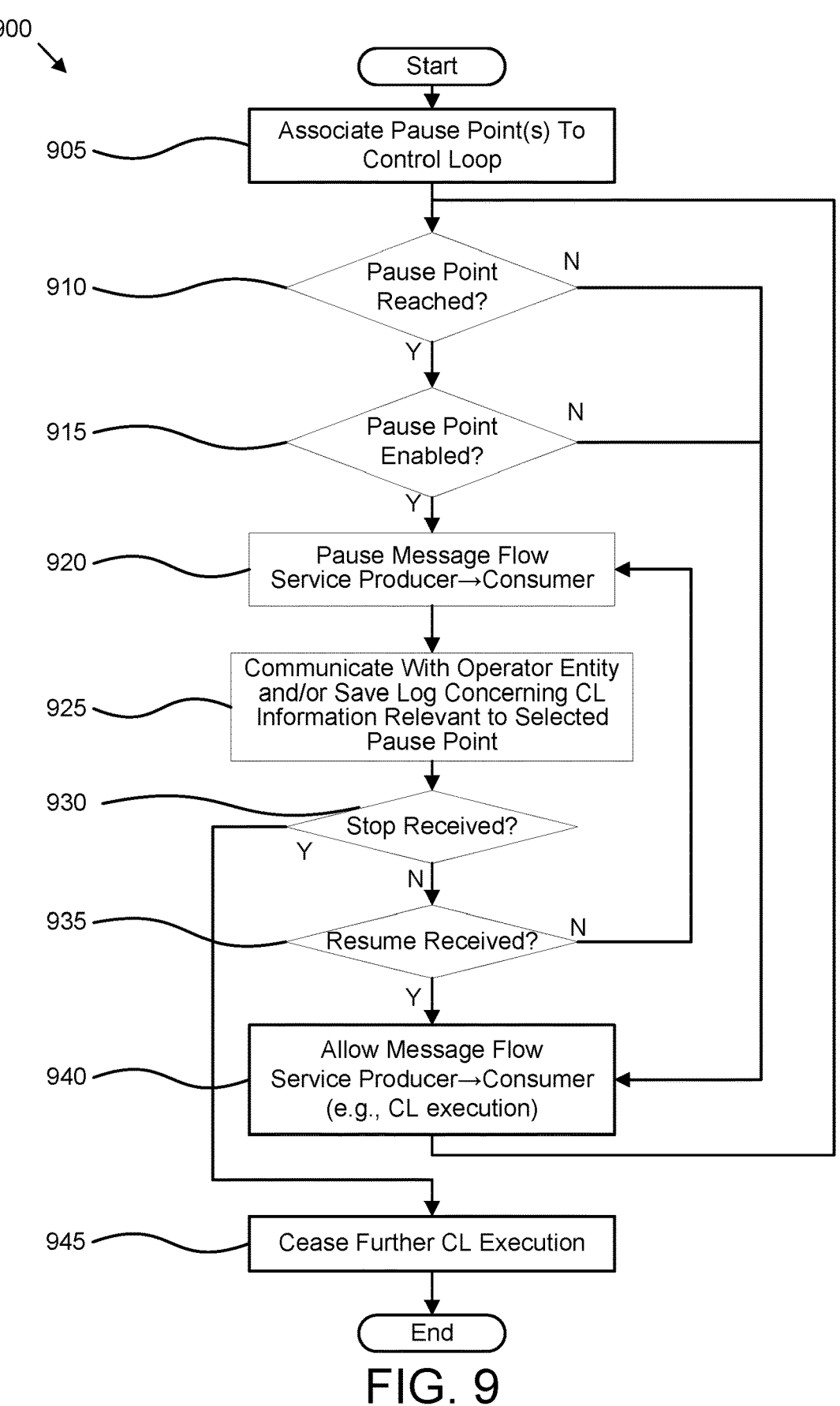
FIG. 9 is a flowchart diagram illustrating a method for pausing control loop execution, according to one or more examples of the present disclosure.

FIG. 9 is a flowchart diagram of a method 900 for pausing control loop automation. In various examples, the method 900 includes various pause point features described above with respect to FIG. 3. In one or more examples, the method 900 begins and includes associating 905 one or more pause points to a control loop of a mobile network that are configurable to pause or resume message flow between a service producer at a selected stage of the control loop directly preceding a selected pause point of the one or more pause points and a service consumer at the next stage of the control loop. In various examples, the method further includes determining 350 (depicted in FIG. 3) whether the selected pause point is reached and pausing 920 or allowing 940 message flow between the service producer at the selected stage of the control loop and the service consumer at the next stage of the control loop in response to the selected pause point being reached based respectively on whether the selected pause point is enabled or disabled.

In certain examples, the method 900 includes respectively enabling or disabling 340 (depicted in FIG. 3) the selected pause point in response to a pause point enablement or disablement request from an operator entity. In some examples, the method 900 further includes communicating 322 supported control loop models to the operator entity, optionally including pause point support, in response to a control loop model request 315. In various examples, the method 900 further includes communicating 330 pause point information in response to a pause point information request 325. In one or more examples, the pause point information includes one or more parameters selected from pause point type, pause point description, stage information relevant to the selected pause point, current analytic insights, available control loop related information/descriptions, pause point status, pause point usage, and combinations thereof.

In some examples, the method 900 includes inserting a pseudo subscriber between a service producer and service consumer of the control loop to serve as the intermediate messaging entity (as described above with respect to FIG. 5). In certain examples, the method 900 includes configuring an existing messaging bus to serve as the intermediate messaging entity, such as depicted above with respect to FIG. 6).

In various examples, as described above with respect to FIGS. 5 and 6, the method 900 includes transforming 525, 625 a relationship between the service producer and the service consumer by: unsubscribing the service consumer from receiving insights from the service producer that are specific to the control loop: subscribing the intermediate messaging entity to receive the insights from the service producer; and subscribing the service consumer to receive the insights from the intermediate messaging entity in response to a request to resume execution of the control loop.

In certain examples, the method 900 includes enabling or disabling all of the one or more pause points in the control loop in response respectively to the pause point enablement or disablement request 335 (described above with respect to FIG. 3).

In some examples, the method 900 includes communicating 345 a pause point request confirmation to the operator entity in response to the pause point enablement or disablement request. In certain examples, as described above with respect to FIG. 3, the method 900 includes generating 350 and communicating 355 a pause point reached notification to the operator entity in response to the control loop reaching an enabled pause point.

In various examples, the method 900 further includes saving 925 a log entry with pause point information in response to logging being enabled for the control loop. In some examples, the method 900 includes allowing 940 the control loop to resume in response to receiving 935 a resume message from the operating entity. In some examples, the method 900 further includes ceasing 945 the further execution of the control loop in response to receiving a stop message from the operating entity.

In some examples, the method 900 includes one or more high level solutions steps S-1 through S8b described above with respect to FIG. 3. In various examples, the method 900 includes one or more 3GPP-based steps M-1 through M-5c described above with respect to FIG. 5 and/or one or more network ETSI ZSM-based steps E-1 through E-5c described above with respect to FIG. 6. Furthermore, in various examples, the method 900 includes various combinations of steps described above with respect to FIGS. 3, 5, and 6. In certain examples, the method 900 may be performed by the system 100 depicted above with respect to FIG. 1 and/or other mobile network entities, components, or services.

Disclosed herein is a system that includes a management service producer for execution management of a control loop of a mobile network, the management service producer for execution management including a processor, memory, and program code operable to communicate with an operator entity of a mobile network. The system includes one or more pause points associated to the control loop that are configurable to pause or allow message flow between a service producer at a selected stage of the control loop and a service consumer at the next stage of the control loop in response to a selected pause point of the one or more pause points being reached based on whether the selected pause point is enabled or disabled. The system in certain examples further includes an intermediate messaging entity disposed between the service producer at the selected stage and the service consumer at the next stage, the intermediate messaging entity configured to respectively enable or disable the selected pause point in response to a pause point enablement or disablement request from the operator entity.

In some examples, pause point related messages between the operator entity and the intermediate messaging entity are communicated via the management service producer for execution management. In various examples, one or more pause point related messages between the operator entity and the intermediate messaging entity are communicated directly rather than via the management service producer for execution management. In certain examples, one or more pause point related messages between the operator entity and the intermediate messaging entity are communicated directly rather than via the management service producer for execution management.

In various examples, the management service producer for execution management is configured to communicate supported control loop models, optionally including pause point support, to the operator entity in response to a control loop model request. In certain examples, the management service producer for execution management is further configured to communicate pause point information to the operator entity in response to a pause point information request.

In some examples, the pause point information includes one or more parameters selected from pause point type, pause point description, stage information relevant to a selected pause point, current analytic insights, available control loop related information/descriptions, pause point status, pause point usage, and combinations thereof. In various examples, the intermediate messaging entity comprises a pseudo subscriber configured to handle pause point messages and inserted between the service producer at the selected stage and the service consumer at the next stage. In certain examples, the intermediate messaging entity comprises a messaging bus between the service producer at the selected stage and the service consumer at the next stage, the messaging bus configured to handle pause point messages.

In various examples, the management service producer for execution management transforms a relationship between a service producer and a service consumer by: unsubscribing the service consumer from receiving insights from the service producer that are specific to the control loop: subscribing the intermediate messaging entity to receive the insights from the service producer; and subscribing the service consumer to receive the insights from the intermediate messaging entity in response to a request to resume execution of the control loop.

In some examples, all of the one or more pause points in the control loop are enabled or disabled in response respectively to the pause point enablement or disablement request. In certain examples, in response to the pause point enablement or disablement request, the intermediate messaging entity communicates a pause point request confirmation to the operating entity.

In various examples, in response to the control loop reaching an enabled pause point, a pause point reached notification is generated and communicated to the operating entity. In some examples, in response to the control loop reaching a disabled pause point, the intermediate messaging entity communicates a pause point passed notification to the operating entity.

In one or more examples, in response to logging being enabled for the control loop, the intermediate messaging entity saves a log entry with pause point information in response to the control loop reaching the selected pause point. In some examples, in response to receiving a resume message from the operating entity, the intermediate messaging entity allows execution of the control loop to resume. In various examples, in response to receiving a stop message from the operating entity, the intermediate messaging entity ceases the further execution of the control loop.

Disclosed herein is method that includes, in various examples, associating one or more pause points to a control loop of a mobile network that are configurable to pause or resume message flow between a service producer at a selected stage of the control loop directly preceding a selected pause point of the one or more pause points and a service consumer at the next stage of the control loop: determining whether the selected pause point is reached; and pausing or allowing message flow between the service producer at the selected stage of the control loop and the service consumer at the next stage of the control loop in response to the selected pause point being reached based respectively on whether the selected pause point is enabled or disabled.

In one or more examples, the method further includes respectively enabling or disabling the selected pause point in response to a pause point enablement or disablement request from an operator entity. In certain examples, the method further includes communicating supported control loop models to the operator entity, optionally including pause point support, in response to a control loop model request.

In some examples, the method further includes communicating pause point information in response to a pause point information request from the operator entity. In some examples, the pause point information includes one or more parameters selected from pause point type, pause point description, current analytic insights, available control loop related information/descriptions, pause point status, pause point usage, and combinations thereof.

In various examples, the method includes inserting a pseudo subscriber between a service producer and service consumer of the control loop to serve as the intermediate messaging entity. In certain examples, the method includes configuring an existing messaging bus to serve as the intermediate messaging entity.

In certain examples, the method further includes transforming a relationship between a service producer and a service consumer by: unsubscribing the service consumer from receiving insights from the service producer that are specific to the control loop: subscribing the intermediate messaging entity to receive the insights from the service producer; and subscribing the service consumer to receive the insights from the intermediate messaging entity in response to a request to resume execution of the control loop.

In various examples, the method includes enabling or disabling all of the one or more pause points in the control loop in response respectively to the pause point enablement or disablement request. In certain examples, the method includes communicating a pause point request confirmation to the operating entity via the management service producer or directly in response to the pause point enablement or disablement request. In some examples, the method includes generating and communicating a pause point reached notification to the operating entity via the management service producer or directly in response to the control loop reaching an enabled pause point.

In various examples, the method further includes saving a log entry with pause point information in response to logging being enabled for the control loop. In certain examples, the method further includes allowing the control loop to resume execution in response to receiving a resume message from the operating entity. In some examples, the method further includes ceasing the further execution of the control loop in response to receiving a stop message from the operating entity.

Examples may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising a service producer, the apparatus further comprising:

at least one memory; and at least one processor coupled with the at least one memory and configured to cause the apparatus to:

communicate one or more supported control loop models to an operator entity separate from the service producer, wherein each control loop model of the one or more supported control loop models defines a sequence of stages to be executed in a supported control loop and at least one stage type for the sequence of stages;

associate one or more pause points to a control loop of a mobile network, wherein the control loop is based on the supported control loop model and one or more pause points configurable to pause or resume message flow between the service producer at a selected stage of the sequence of stages directly preceding a selected pause point of the one or more pause points and a service consumer at the next stage of the sequence of stages;

configure an intermediate messaging entity to enable or disable the selected pause point in response to a pause point enablement request or a pause point disablement request from an operator entity; and pause or allow messages to flow between the service producer at the selected stage of the sequence of stages and the service consumer at the next stage of the sequence of stages in response to the selected pause point being reached based respectively on whether the selected pause point is enabled or disabled.

2. The apparatus of claim 1, wherein the at least one processor is configured to cause the apparatus to communicate the one or more supported control loop models in response to a control loop model request and the one or more supported control loop models include pause point information.

3. The apparatus of claim 2, wherein the pause point information comprises one or more parameters selected from pause point type, pause point description, stage information relevant to the selected pause point, current analytic insights, available control loop related information/descriptions, pause point status, pause point usage, and combinations thereof.

4. The apparatus of claim 2, wherein the at least one processor is configured to cause the apparatus to save a log entry with the pause point information in response to logging being enabled for the control loop.

5. The apparatus of claim 1, wherein the at least one processor is configured to cause the apparatus to cause an existing messaging bus to serve as the intermediate messaging entity.

6. The apparatus of claim 1, wherein the at least one processor is configured to cause the apparatus to insert a pseudo subscriber between the service producer and the service consumer of the control loop to serve as the intermediate messaging entity by:

unsubscribing the service consumer from receiving insights from the service producer that are specific to the control loop;

subscribing the intermediate messaging entity to receive the insights from the service producer; and subscribing the service consumer to receive the insights from the intermediate messaging entity in response to a request to resume execution of the control loop.

7. The apparatus of claim 1, wherein the at least one processor is configured to cause the apparatus to enable or disable all of the one or more pause points in the control loop in response respectively to the pause point enablement request or the pause point disablement request.

8. The apparatus of claim 1, wherein the at least one processor is configured to cause the apparatus to communicate a pause point request confirmation to the operator entity in response to the pause point enablement request or the pause point disablement request.

9. The apparatus of claim 1, wherein the at least one processor is configured to cause the apparatus to generate and communicate a pause-point-reached notification to the operator entity in response to the control loop reaching an enabled pause point.

10. The apparatus of claim 1, wherein the at least one processor is configured to cause the apparatus to allow the control loop to resume execution in response to receiving a resume message from the operating entity.

11. A method comprising:

communicating one or more supported control loop models to an operator entity separate from a service producer, wherein each control loop model of the one or more supported control loop models defines a sequence of stages to be executed in a supported control loop and at least one stage type for the sequence of stages;

associating one or more pause points to a control loop of a mobile network, wherein the control loop is based on the supported control loop model and the one or more pause points configurable to pause or resume message flow between the service producer at a selected stage of the sequence of stages directly preceding a selected pause point of the one or more pause points and a service consumer at the next stage of the sequence of stages;

configuring an intermediate messaging entity to enable or disable the selected pause point in response to a pause point enablement request or a pause point disablement request from an operator entity; and pausing or allowing message flow between the service producer at the selected stage of the sequence of stages and the service consumer at the next stage of the sequence of stages in response to the selected pause point being reached based respectively on whether the selected pause point is enabled or disabled.

12. The method of claim 11, further comprising communicating the one or more supported control loop models to the operator entity in response to a control loop model request, wherein the one or more supported control loop models include pause point information.

13. The method of claim 12, further comprising saving a log entry with the pause point information in response to logging being enabled for the control loop.

14. The method of claim 12, wherein the pause point information comprises one or more parameters selected from pause point type, pause point description, stage information relevant to the selected pause point, current analytic insights, available control loop related information/descriptions, pause point status, pause point usage, and combinations thereof.

15. The method of claim 11, further comprising inserting a pseudo subscriber between the service producer and the service consumer of the control loop to serve as the intermediate messaging entity by:

unsubscribing the service consumer from receiving insights from the service producer that are specific to the control loop;

subscribing the intermediate messaging entity to receive the insights from the service producer; and subscribing the service consumer to receive the insights from the intermediate messaging entity in response to a request to resume execution of the control loop.

16. The method of claim 11, further comprising enabling or disabling all of the one or more pause points in the control loop in response respectively to the pause point enablement request or the pause point disablement request.

17. The method of claim 11, further comprising allowing the control loop to resume execution in response to receiving a resume message from the operating entity.

18. A system comprising:

a management service producer for execution management of a control loop of a mobile network, the management service producer comprising a processor, memory, and program code operable to communicate one or more supported control loop models to an operator entity separate from the management service producer, wherein:

each loop model of the one or more supported control loop models defines a sequence of stages to be executed in a supported control loop and at least one stage type for the sequence of stages; and the control loop is based on the supported control loop model and one or more pause points configurable to pause or allow messages to flow between a service producer at a selected stage of the sequence of stages and a service consumer at the next stage of the sequence of stages in response to a selected pause point of the one or more pause points being reached based on whether the selected pause point is enabled or disabled; and an intermediate messaging entity disposed between the service producer at the selected stage and the service consumer at the next stage, the intermediate messaging entity configured to respectively enable or disable the selected pause point in response to a pause point enablement or disablement request from the operator entity.

19. The system of claim 18, wherein an existing messaging bus is configured to serve as the intermediate messaging entity.

20. The system of claim 18, wherein the processor, the memory, and the program code is operable to insert a pseudo subscriber between the service producer and the service consumer of the control loop to serve as the intermediate messaging entity by:

unsubscribing the service consumer from receiving insights from the service producer that are specific to the control loop;

subscribing the intermediate messaging entity to receive the insights from the service producer, and subscribing the service consumer to receive the insights from the intermediate messaging entity in response to a request to resume execution of the control loop.

\* \* \* \* \*